United States Patent Office 3,506,656
Patented Apr. 14, 1970

3,506,656
TRIAZOLO-TETRAZOLO-PYRIDAZINE
DERIVATIVES
Herbert Berger, Sulzberg-Ried, Allgau, Kurt Stach, Mannheim-Waldhof, and Wolfgang Voemel, Mannheim, Germany, assignors to Boehringer Mannheim Gesellschaft mit beschrankter Haftung, Mannheim-Waldhof, Germany, a corporation of Germany
No Drawing. Filed Oct. 19, 1967, Ser. No. 676,645
Claims priority, application Germany, Oct. 22, 1966,
B 89,538; May 13, 1967, B 92,514
Int. Cl. C07d 51/76
U.S. Cl. 260—240                                            7 Claims

ABSTRACT OF THE DISCLOSURE

A novel series of triazolo-tetrazolo-pyridazine derivatives is disclosed which evidence outstanding germistatic action and are highly effective anti-bacterial agents particularly suitable for use in the treatment of infections of the urinary tract. The novel triazolo-tetrazolo-pyridazine derivatives of the invention have the following structural formula:

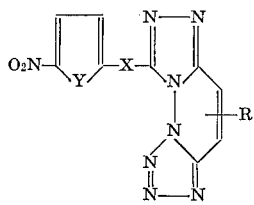

wherein X is a valency bond or vinyl, Y is oxygen or sulfur and R is hydrogen, halogen, substituted or unsubstituted lower alkyl, alkoxy, alkylmercapto or amino, wherein said substituent is lower alkyl or acyl.

---

This invention relates to triazolo-tetrazolo-pyridazine derivatives and to processes of making and using the same.

More particularly this invention relates to compounds having the formula:

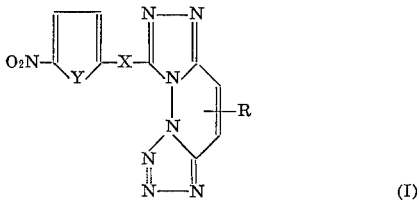

wherein X is a valency bond or vinyl, Y is oxygen or sulfur and R is hydrogen, halogen, substituted or unsubstituted lower alkyl, alkoxy, alkylmercapto or amino, wherein said substituent is lower alkyl or acyl.

The new triazolo-tetrazolo-pyridazine derivatives in accordance with the invention are highly effective germicidal agents and in particular exhibit marked antibacterial activity in urine making them especially suitable for use in the treatment of infections in the urinary tract.

The novel triazolo-tetrazolo-pyridazine derivatives of the present invention can be prepared in the conventional manner, as for example, by one of the following methods:

(a) treating a hydrazone of the formula:

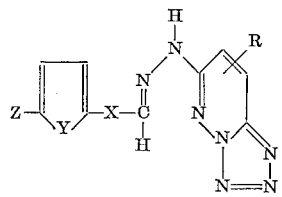

wherein R, X and Y are each as above defined and Z is hydrogen or nitro, with an oxidation agent, (b) heating a carboxylic acid hydrazide of the formula:

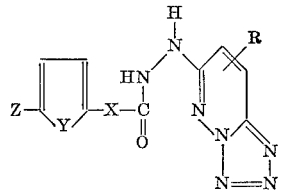

wherein R, X and Y and Z have the same meanings as given above, possibly with the addition of a dehydration agent; or (c) heating an amidrazone of the formula:

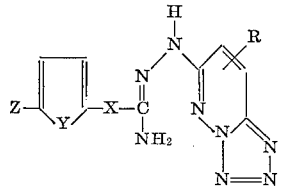

wherein R, X, Y and Z have the same meanings as given above, possibly with the addition of an ammonia-accepting agent.

In those instances in which Z is hydrogen, the products which are obtained are thereafter nitrated in the known manner and in those cases in which R is amino, the compound, if desired, can be subjected to a further reaction whereby the amino group is alkylated or acylated.

For carrying out reaction (a), the compound (II) is reacted with a conventional oxidation agent, such as, for example, bromine, ferric chloride and the like, and preferably with lead tetraacetate, in a suitable insert solvent, such as ethanol or glacial acetic acid. The reaction, with the oxidation agent, can be considerably accelerated by heating the reaction mixture to about 100° C.

The hydrazone (II) used as starting material can be prepared, in the known manner, such as by the condensation of an aldehyde of the formula:

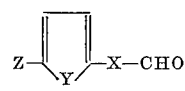

in which X, Y and Z are each as above defined, with a hydrazine of the formula:

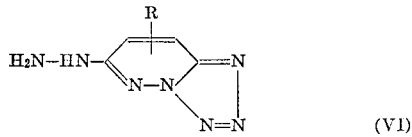

in which R has the same meaning as given above.

The hydrazines (VI) can be obtained by the reaction of a 4- or 5-R-substituted 3-chloro-6-hydrazino-pyridazine with aqueous nitrous acid to give the corresponding 6-chloro-tetrazolo-[1,5-b]-pyridazine which, on being heated with hydrazine hydrate, is converted into the 6-hydrazino-tetrazolo-[1,5-b]-pyridazine.

The cyclization effected according to reaction (b) by the dehydration of a compound (III) can be carried out, in the simplest case, merely by heating the compound (III) but it is also possible to use an inert solvent and also to remove the water formed in the cyclization by the addition of a dehydrating agent, such as phosphorus oxychloride.

The compound (III) suitable for use as starting material can be prepared in the known manner by heating a hydrazine of the Formula VI with an acid of the formula:

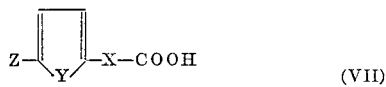

in which X, Y and Z have the same meanings as set out above.

In place of the free acids (VII), there can also be used their reactive derivatives, such as their halides, esters and the like. A particularly advantageous variant of this process is one in which the compounds (III) are not isolated but merely heated, possibly in the presence of a dehydrating agent, in a high boiling, inert solvent until ring closure has taken place with the formation of the desired triazolo-tetrazolo-pyridazine derivative (I).

The cyclization of the amidrazone (IV) according to reaction (c) can be carried out simply by warming the amidrazone (IV), possibly in an inert solvent. When an ammonia-accepting agent, as for instance, a dilute acid, is added to the reaction mixture, then the reaction is considerably accelerated and can even be carried out at ambient temperature.

The amidrazones (IV) used in the reaction as starting materials can be prepared by the reaction of a hydrazine of the Formula VI with an imido ether of the formula:

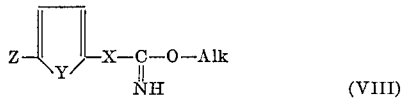

in which X, Y and Z have the same meanings as given above and "Alk" is alkyl. The reaction is preferably carried out in an inert solvent, such as for instance, an aqueous alcohol, at ambient temperature or at a slightly elevated temperature.

In accordance with the invention, it has also been found that the desired compounds (I) in which R is other than halogen, can be prepared by the reaction of an alkali metal azide with a halide of the formula:

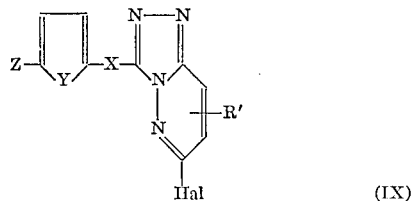

in which X, Y and Z have the same meanings as set out above, Hal is chlorine, bromine or iodine and R' is hydrogen, substituted or unsubstituted lower alkyl, alkoxy, alkylmercapto or amino, wherein said substituent is lower alkyl or acyl.

In this instance, as in those cases in which Z is hydrogen, the reaction products which are obtained are thereafter nitrated in the known manner and in those instances in which R is amino, the reaction production can, if desired, be further reacted whereby said amino group is alkylated or acylated.

For carrying out this last-mentioned reaction using as reactants a compound (IX) and an alkali metal azide, the reaction components are heated in a suitable organic solvent, such as, for example, dimethyl sulfoxide or dioxan, or mixtures thereof with water.

The halides having the Formula IX used as starting materials can be prepared, for example, by the process disclosed in U.S. application Ser. No. 638,174, by the cyclization of an appropriate nitrofurfurylidene- or nitrothienylidene-pyridazinyl-hydrazine or of the corresponding amidrazones.

In those cases, where Z, in the starting materials having structural Formulae II, III, IV, or IX, is hydrogen, the triazolo-tetrazolo-pyridazine derivatives which are obtained are thereafter nitrated in order to obtain the desired nitro compounds (I). The nitration is preferably carried out in a solvent, such as acetic anhydride. When R is a free amino group then, under these reaction conditions, it is acetylated but, at the same time, is protected from attack by the nitric acid. If desired, the acetyl group can thereafter be removed by saponification. Of course, in those cases in which the substituent R in the product (I) which is obtained is a free amino group, it can, if desired, be subsequently converted into an alkylamino or acylamino group by reaction with a conventional N-alkylation or N-acylation reagent, respectively.

The invention is further disclosed by the following examples, which are given merely for the purpose of illustrating specific embodiments of the invention, without limiting it in spirit or scope.

EXAMPLE 1

3-(5-nitro-2-furyl)-s-triazolo-[4,3-b]-tetrazolo-[1',5'-f]-pyridazine 1.37 g. 1-(5-nitro-2-furfurylidene) - 2 - (6 - tetrazolo-[1,5-b]-pyridazinyl)-hydrazine were added portionwise, with stirring, to a solution of 3.34 g. lead tetraacetate in 50 ml. glacial acetic acid at a temperature of 80° C. in such a manner that the added portion was always allowed to dissolve before the next portion was introduced. The resulting reaction mixture was thereafter stirred for 15 minutes at 80° C., the solution cooled and the separated crystals filtered off with suction, washed with glacial acetic acid and dried. There were thusly obtained 0.9 g. 3-(5-nitro-2-furyl)-s-triazolo-[4,3-b]-tetrazolo-[1',5'-f]-pyridazine, which had a melting point of 185–188° C. (decomp.).

The 1-(5-nitro-2-furfurylidene)-2-(6-tetrazolo-[I,5-b]-pyridazinyl)-hydrazine used as starting material was prepared in the following manner: 4 g. 3-chloro-6-hydrazino-pyridazine were suspended in 32 ml. of 12% aqueous acetic acid, a solution of 1.84 g. sodium nitrite in 13 ml. water was added dropwise thereto, while stirring, at 0° C. The stirring was continued for an additional 15 minutes, and the solid material filtered off with suction, washed with water and dried. There were thusly obtained 3.5 g. 6-chloro-tetrazolo-[1,5-b]-pyridazine, which had a melting point of 107–109° C.

1.55 g. of this crude product were suspended in 3 ml. ethanol, 1.8 ml. of an 80% aqueous hydrazine hydrate added thereto and, after the vigorous reaction had subsided, the reaction mixture was boiled under reflux for 1 hour. The reaction mixture was thereafter evaporated to dryness in a vacuum, the residue triturated with 3 ml. ice water, filtered with suction and dried. There were thusly obtained 1.4 g. crude 6-hydrazino-tetrazolo-[1,5-b]-pyridazine.

1.3 g. 5-nitro-2-furfural were dissolved in 18 ml. of 80% aqueous ethanol, mixed with 1.4 g. crude 6-hydrazino-tetrazolo-[1,5-b]-pyridazine and the reaction mixture boiled under reflux for 1 hour. After cooling, the crystals which separated out were filtered off with suction (2.3 g.). Following recrystallization from 9 ml. dimethyl formamide, there were obtained 1.8 g. 1-(5-nitro-2-furfurylidene) - 2 - (6 - tetrazolo-[1,5-b]-pyridazinyl)-hydrazine, which foamed at 266–270° C. However, for the further reaction of this compound with an oxidation agent, it was not necessary to carry out a recrystallization but it was possible to directly use the crude product.

EXAMPLE 2

3-[2-(5-nitro-2-furyl)-vinyl]-s-triazolo-[4,3-b]-tetrazolo-[1′,5′-f]-pyridazine 1.2 g. 5-nitrofuryl-acrolein-(6-tetrazolo-[1,5-b]-pyridazinyl)-hydrazone were added portionwise, with stirring, to a solution of 3.6 g. lead tetraacetate in 56 ml. glacial acetic acid at a temperature of 80° C. in such a manner that an added portion was allowed to dissolve before the next portion was introduced. The time required for the addition in this fashion amounted to about 1–2 hours. As soon as the last added portion no longer dissolved completely, a further 0.6 g. lead tetraacetate was added. After cooling, the yellow crystals which separated were filtered off with suction. There was thus obtained 0.57 g. 3-[2-(5-nitro - 2 - furyl) - vinyl]-s-triazolo-[4,3-b]-tetrazolo-[1′,5′-f]-pyridazine which had a melting point of 210–212° C. (foaming).

The 5-nitrofuryl-acrolein-(6-tetrazolo-[1,5-b]-pyridazinyl)-hydrazone used as starting material was prepared in the following manner: 2.26 g. 6-hydrazino-tetrazolo-[1,5-b]-pyridazine were added to a hot solution of 2.5 g. β-(5-nitro-2-furyl)-acrolein in 28 ml. of 80% aqueous ethanol and the reaction mixture then boiled under reflux for 2 hours. After cooling, the crystals which separated out were filtered off with suction, washed with ethanol and dried. There were thusly obtained 3.9 g. 5-nitrofuryl-acrolein-(6-tetrazolo - [1,5-b] - pyridazinyl)-hydrazone which following recrystallization from 20 ml. dimethyl formamide, foamed at 260° C.

EXAMPLE 3

3-(5-nitro-2-furyl)-11-methyl-s-triazolo-[4,3-b]-tetrazolo-[1′,5′-f]-pyridazine 2.5 g. 1-(5-nitro-2-furfurylidene)-2-(7-methyl-tetrazolo-[1,5-b]-pyridazinyl-6)-hydrazine were added portionwise, while stirring and at a temperature of 80° C., to a solution of 6.1 g. lead tetraacetate in 48 ml. glacial acetic acid and stirring continued for a further 45 minutes at 80° C. Solution took place during this period for a short time. The precipitated crystals were then filtered off with suction at 80° C. (0.92 g.) and washed with glacial acetic acid and ether. A further 0.62 g. of the same material can be isolated from the cooled mother liquor. The combined crystals were thereafter recrystallized from a mixture of 95% dioxan and 5% dimethyl formamide. In this way, there were obtained 1.1 g. 3-(5-nitro-2-furyl)-11-methyl-s-triazolo-[4,3-b]-tetrazolo-[1′,5′-f]-pyridazine in the form of pale yellow crystals which had a melting point of 222–226° C. (decomp.).

The structure of the product was verified from the carbon and hydrogen analyses and from the NMR and infrared spectra. The infrared spectrum clearly showed the characteristic band for an azide group, whereas the infrared spectrum of the starting material does not show the band for an azide group. From this, it could be established that the above-mentioned compound was in equilibrium with a tautomeric form, namely, 3-(5-nitro-2-furyl)-6-azido-8-methyl-s-triazolo-[4,3-b]-pyridazine.

This also applies to the products of Examples 1 and 2.

The 1-(5-nitro-2-furfurylidene)-2-(7-methyl-tetrazolo-[1,5-b]pyridazinyl-6)-hydrazine used as starting material was prepared in the following manner: 2.6 g. 7-methyl-6-chloro-tetrazolo-[1,5-b]-pyridazine (M.P. 136° C.) were boiled under reflux for 1 hour with a mixture of 8 ml. ethanol and 3.1 ml. of an 80% aqueous hydrazine hydrate, thereafter cooled and the separated crystals filtered off with suction and washed with water. There were thusly obtained 2.45 g. crude 6-hydrazino-7-methyl-tetrazolo-[1,5-b]-pyridazine, which had a melting point of 282–283° C. (decomp.).

2.4 g. of this hydrazino compound were boiled under reflux for 30 minutes with a solution of 2.32 g. 5-nitro-furan-2-aldehyde in 33 ml. of 80% aqueous ethanol to which 1 ml. glacial acetic acid had previously been added. After cooling, the resultant crystals were filtered off with suction (4.1 g.; M.P. 260–263° C. (decomp.)) and washed with 50% aqueous ethanol. 3.5 g. of this crude product were recrystallized from 80 ml. of a mixture of dioxan-dimethyl formamide (1:1). There were thusly obtained 2.55 g. 1-(5-nitro-2-furfurylidene)-2-(7-methyl-tetrazolo-[1,5-b]-pyridazinyl-6)-hydrazine, which had a melting point of 278–280° C. (decomp.).

EXAMPLE 4

3-(5-nitro-2-furyl)-10-methyl-s-triazolo-[4,3-b]-tetrazolo-[1′,5′-f]-pyridazine 1.7 g. 1-(5-nitro-2-furfurylidene)-2-(8-methyl-tetrazolo-[1,5-b]-pyridazinyl-6)-hydrazine were introduced portionwise, while stirring and at a temperature of 80° C., into a solution of 4.15 g. lead tetraacetate in 32.5 ml. glacial acetic acid and the reaction mixture thereafter maintained for a further 45 minutes at 80° C. The clear solution which formed was then evaporated in a vacuum, the residue triturated with 20 ml. water and the solid material thus obtained (1.67 g.) recrystallized from 70 ml. of a mixture of 80% isopropanol and 20% dioxan, with the addition of activated charcoal. There was obtained 0.8 g. 3-(5-nitro - 2 - furyl) - 10 - methyl-s-triazolo-[4,3-b]-tetrazolo-[1′,5′-f]-pyridazine in the form of pale yellow crystals which had a melting point of 151–152° C. (decomp.).

The structure agrees with the carbon and hydrogen analyses and with the infrared and NMR spectra. The substance was in equilibrium with a tautomeric azido form, namely, 3-(5 - nitro - 2 - furyl) - 6 - azido - 7 - methyl-s-triazolo-[4,3-b]-pyridazine.

The 1-(5 - nitro - 2 - furfurylidene) - 2 - (8 - methyl-tetrazolo-[1,5-b]-pyridazinyl-6)-hydrazine used as starting material was prepared, by a procedure analogous to that described in Example 3, by the reaction of 8-methyl-6-chloro-tetrazolo-[1,5-b]-pyridazine (M.P. 102° C.) with hydrazine hydrate and subsequent condensation of the 8-methyl-6-hydrazino-tetrazolo-[1,5 - f]-pyridazine (M.P. 240–242° C.) obtained with 5-nitro-2-furfural; M.P. 280–281° C. (decomp.).

EXAMPLE 5

3-(5-nitro-2-thienyl)-s-triazolo-[4,3-b]-tetrazolo-[1′,5′-f]-pyridazine

Using a procedure analogous to that described in Example 1 and by the oxidation of 1.4 g. 1-(5-nitro-2-thienylidene)-2-(6-tetrazolo-[1,5-b]-pyridazinyl)-hydrazine with lead tetraacetate, there was obtained 1 g. 3-(5-nitro-2-thienyl)-s-triazolo-[4,3 - b]-tetrazolo-[1′,5′-f]-pyridazine, which was a pale yellow compound having a melting point of 199–200° C. (foaming).

The structure was confirmed by the carbon, hydrogen and sulfur analyses, as well as by the NMR and infrared spectra. In this case, too, there was an equilibrium with the tautomeric azide form, namely, with 3-(5-nitro-2-thienyl)-6-azido-s-triazolo-[4,3-b]-pyridazine.

The 1-(5 - nitro - 2 - thienylidene) - 2 - (6 - tetrazolo-[1,5-b]-pyridazinyl)-hydrazine used as starting material was prepared in the following manner: 3 g. crude 6-hydrazino-tetrazolo-[1,5-b]-pyridazine (M.P. 235–243° C. foaming) were heated with a solution of 3.14 g. 5-nitrothiophene-2-aldehyde in 40 ml. 80% aqueous ethanol, to which 1.2 ml. glacial acetic acid had been added, the heating being carried out under reflux for 1 hour. After cooling, the reaction mixture, the red crystals which formed, were filtered off with suction and washed with a mixture of methanol-water (1:1). There were thusly obtained 4.82 g. 1-(5-nitro-2-thienylidene)-2-(6-tetrazolo-[1,5-b]-pyridazinyl)-hydrazine. The compound was used for the subsequent reaction without further purification.

EXAMPLE 6

3-(5-nitro-2-furyl)-10-N-pyrrolidinyl-s-triazolo-[4,3-b]-tetrazolo-[1′,5′-f]-pyridazine 6.75 g. 1-(5-nitro-2-furfurylidene)-2-(8-N-pyrrolidinyl-tetrazolo-[1,5-b]-pyridazinyl-6)-hydrazine were dissolved at 80° C. in 100 ml. trifluoroacetic acid. The solution of 20 g. lead tetraacetate in 250 ml. glacial acetic acid was added thereto slowly, while stirring, at 80° C. and stirring continued at 80° C. for a further 15 minutes. Some activated charcoal was then added, followed by filtration and the filtrate was then evaporated in a vacuum. The residue was triturated with water, the solid material filtered off with suction, dissolved in 10 ml. hot dioxan and left to crystallize overnight at ambient temperature. The red crystals thereby obtained were filtered off with suction, washed with dioxan and recrystallized from 20 ml. of a mixture of dimethyl formamide-dioxan (1:1), with the addition of activated charcoal. For further purification, the product was boiled with 30 ml. dioxan and the undissolved red product filtered off with suction while still hot. In this manner, there were obtained 1.05 g. 3-(5-nitro-2 - furyl) - 10 - N-pyrrolidinyl-s-triazolo-[4,3-b]-tetrazolo-[1′,5′-f]-pyridazine, which discolored at temperatures beyond 210° C. and which melted, with foaming, at 260° C. Further amounts of this compound could be isolated from the mother liquors.

The structure was confirmed by the carbon and hydrogen analyses, as well as by the NMR and infrared spectra. There was an equilibrium with the tautomeric azido form, and namely, 3-(5-nitro-2-furyl)-6-azido-7-N-pyrrolidinyl-s-triazolo-[4,3-b]-pyridazine.

The 1 - (5 - nitro-2-furfurylidene)-2-(8-N-pyrrolidinyl-tetrazolo-[1,5-b]-pyridazinyl-6)-hydrazine used as starting material was prepared in the following manner: 20 g. 3,4,6-trichloropyridazine were dissolved in 55 ml. anhydrous toluene and 16.7 g. pyrrolidine added dropwise thereto, while stirring, at ambient temperature. Due to the strongly exothermic reaction, the solution began to reflux. The reaction mixture was then evaporated under vacuum, the residue taken up in ethanol and the suspension thus obtained again evaporated in a vacuum. The resultant residue was triturated with water, the solid product obtained filtered off with suction and, while still moist, recrystallized from 270 ml. 70% aqueous ethanol. There were thusly obtained 17.1 g. 3,6-dichloro-4-N-pyrrolidinyl-pyridazine, which had a melting point of 153–155° C.

16.6 g. of this compound were boiled under reflux for 3 hours with 80 ml. hydrazine hydrate and 50 ml. ethanol. The solution was thereafter treated with activated charcoal, filtered and allowed to cool. After standing for some time in the cold, the separated crystals were filtered off with suction, washed with water and dried in a vacuum at 50° C. In this way, there were obtained 10.85 g. crude 3-hydrazino - 4 - N-pyrrolidinyl-6-chloropyridazine, which had a melting point of 114–120° C.

This hydrazino compound was dissolved in 85 ml. of 12% aqueous acetic acid and mixed dropwise at 0° C., while stirring, with a solution of 3.5 g. sodium nitrite in 28 ml. water. The resultant reaction mixture was stirred for a further 15 minutes at 0° C. The precipitated crystals which separated were filtered off with suction, washed with water and dried. 11.13 g. crude 6-chloro-8-N-pyrrolidinyl-tetrazolo-[1,5-b]-pyridazine, having a melting point of 151–153° C. were thereby obtained.

This latter compound was heated for 30 minutes on a steam bath with 45 ml. ethanol and 65 ml. hydrazine hydrate and the reaction mixture thereafter evaporated in a vacuum. The residue was triturated with ice water, the precipitated solid product filtered off with suction and washed with water. There were thusly obtained 8.05 g. crude 6-hydrazino-8-N-pyrrolidinyl-tetrazolo-[1,5-b]-pyridazine, which had a melting point of 223–228° C.

This compound was then introduced into 190 ml. of 80% aqueous ethanol and 2 N hydrochloric acid added in an amount such that an almost clear solution was obtained (somewhat more than the equimolar amount). The small amount of insoluble material present was filtered off with suction, the clear filtrate mixed with 5.7 g. 5-nitrofuran-2-aldehyde and heated under reflux for 15 minutes. After cooling, the crystals which were obtained were filtered off with suction, washed with 80% aqeuous ethanol and dried. There were thusly obtained 11.92 g. crude 1 - (5 - nitro - 2-furfurylidene)-2-(8-N-pyrrolidinyl-tetrazolo-[1,5-b]-pyridazinyl-6)-hydrazine, which could be used directly, without further purification, for the subsequent reaction.

EXAMPLE 7

3-(5-nitro-2-furyl)-s-triazolo-[4,3-b]-tetrazolo-[1′,5′-f]-pyridazine 0.52 g. 3-(5-nitro-2-furyl)-6-chloro-s-triazolo-[4,3-b]-pyridazine (M.P. 222–226° C.) was dissolved in 16 ml. hot 90% aqeuous dimethyl sulfoxide, 0.46 g. sodium azide was added to the resulting solution followed by the addition of 1 ml. 2 N hydrochloric acid and the reaction allowed to proceed for 2 hours at 100° C. Following the addition of a further 0.23 g. sodium azide and 5 drops 2 N hydrochloric acid, the reaction mixture was maintained at 100° C. for a further 2 hours, then allowed to cool and the crystals which formed filtered off with suction and thoroughly washed with water. There was obtained 0.44 g. 3-(5 - nitro - 2-furyl)-s-triazolo-[4,3-b]-tetrazolo-[1′,5′-f]-pyridazine, which had a melting point of 185° C. (decomp.).

The compound can be recrystallized from dimethyl formamide and from dioxan. According to the infrared spectrum, the 3-(5-nitro-2-furyl)-s-triazolo-[4,3-b]-tetrazolo-[1′,5′-f]pyridazine was in tautomeric equilibrium with an azido form and namely with 3-(5-nitro-2-furyl)-6-azido-s-triazolo-[4,3-b]-pyridazine.

EXAMPLE 8

3-(5-nitro-2-furyl)-10-methyl-s-triazolo-[4,3-b]-tetrazolo-[1′,5′-f]pyridazine 0.98 g. crude 3-(5-nitro-2-furyl)-6-chloro-7-methyl-s-triazolo-[4,3-b]-pyridazine (M.P. 126–129° C., decomp.) was dissolved in 14 ml. hot 90% aqueous dimethyl sulfoxide. 1.75 ml. 2 N hydrochloric acid was added to the resulting solution followed by 1.2 g. sodium azide and the reaction mixture then maintained for 2 hours at 100° C. After cooling, the crystals which separated out were filtered off with suction, washed with 90% aqeuous dimethyl sulfoxide, the filter residue triturated with water, again filtered with suction yielding 0.95 g. of material which was recrystallized from 15 ml. 60% aqeuous dioxan with the use of activated charcoal. In this manner, there was obtained 0.63 g. 3-(5-nitro-2-furyl)-10-methyl-s-triazolo-[4,3-b]-tetrazolo-[1′,5′-f]-pyridazine in the form of yellow crysstals, which had a melting point of 165–173° C. (decomp.).

The infrared and the NMR spectra indicated that the compound was in tautomeric equilibrium with an azido form, namely, 3-(5-nitro-2-furyl)-6-azido-7-methyl-s-triazolo-[4,3-b]-pyridazine.

The 3 - (5-nitro-2-furyl)-6-chloro-7-methyl-s-triazolo-

[4,3-b]-pyridazine which was used as starting material was prepared in the following manner: 3.17 g. 3-chloro-4-methyl-6-hydrazino-pyridazine (M.P. 156–158° C.) were dissoved in 60 ml. warm 75% aqueous methanol and mixed at 50° C. while stirring, with 3.68 g. 5-nitro-furan-2-imido-carboxylic acid ethyl ester. The reaction mixture was maintained for 30 minutes at 50° C., and then cooled. The very dark red colored crystals which were formed were filterd off with suction and then washed with 75% aqueous methanol to give 4.9 g. crude 6-[N'-(5-nitro-2-imidofuroyl) - hydrazino - 4 - methyl-3-chloropyridazine, which had a melting point of 214–216° C. (decomp.).

3.9 g. of this compound were finely powdered and heated to 80° C. for 60 minutes with 52 ml. 5 N hydrochloric acid, the suspension being frequently thoroughly ground up with a glass rod. After cooling, the solid material was filtered off with suction, washed with water and dried to give 3.2 g. crude 3-(5-nitro-2-furyl)-6-chloro-7-methyl-s-triazolo-[4,3-b]-pyridazine, which had a melting point of 126–129° C. (decomp.).

A 0.22 g. sample thereof was recrystallized from a mixture of 2 ml. dimethyl formamide, 2 ml. dioxan and 1 ml. water, with the addition of activated charcoal, and then melted at 136–139° C. (decomp.).

EXAMPLE 9

3-(5-nitro-2-furyl)-10-amino-s-triazolo-[4,3,-b]-tetrazolo-[1',5'-f]-pyridazine 4.6 g. crude N-[6-(8-amino-tetrazolo-[1,5-b]-pyridazinylamino)]-5-nitro-2-furamidine were heated for 2 hours under reflux (120° C. bath temperature) with 92 ml. 40% sulfuric acid in n-propanol. After allowing the reaction mixture to stand for 2 days in a refrigerator, the crystals which formed were filtered off with suction, washed with n-propanol and dried in a vacuum at 80° C. 3.95 g. of crystals were thereby obtained as the sulfuric acid salt which formed at about 221° C.

This material was dissolved in 400 ml. of a boiling mixture of 300 ml. water, 100 ml. sulfuric acid and 200 ml. ethanol, hot filtered from a small amount of insoluble material and the hot solution then introduced into a well stirred solution of 50 ml. concentrated aqueous ammonia in 200 ml. water. 2.16 g. of orange-colored crystals thereby precipitating out. After washing with water and drying, this material was recrystallized from 50 ml. 90% aqueous dimethyl formamide, with the addition of activated charcoal. There were thusly obtained 1.1 g. 3-(5-nitro-2-furyl)-10-amino-s-triazolo - [4,3-b] - tetrazolo-[1',5'-f]-pyridazine which was in equilibrium with a tautomeric form and namely with 3 - (5-nitro-2-furyl)-6-azido-7-amino-s-triazolo-[4,3-b]-pyridazine. The compound became black colored at 220° C., a color change taking place beyond 205° C. When the compound was rapidly dry heated in a test tube over a strong Bunsen flame, decrepitation occurred. The carbon and hydrogen analyses, as well as the NMR and infrared spectra which were obtained, support the assumed structure.

The N-[6-(8-amino-tetrazolo - [1,5-b] - pyridazinylamino)]-5-nitro-2-furamidine used as starting material was prepared in the following manner: 10.9 ml. concentrated hydrochloric acid were added to a suspension in 182 ml. water of 20 g. finely powdered, crude 3-hydrazino-4-amino-6-chloro-pyridazine (M.P. 203–206° C. with foaming). A solution of 9.1 g. sodium nitrite in 73 ml. water was then added dropwise, with stirring, at ambient temperature, the reaction mixture stirred for a further 30 minutes, filtered with suction, washed with water and dried at 90° C. in a vacuum. There were thusly obtained 20.65 g. crude 6-chloro-8-amino-tetrazolo-[1,5-b]-pyridazine which became discolored at temperatures greater than 220° C. and melted with decomposition at 270° C.

The 20.65 g. of this product were heated for 30 minutes on a steam bath with a mixture of 95 ml. ethanol and 95 ml. hydrazine hydrate, whereby, from the solution initially obtained, crystals precipitated out after a short time. After cooling, the crystals were filtered off with suction and thoroughly washed with cold water. After drying in a vacuum at 80° C., there were obtained 17.4 g. crude 6-hydrazino-8-amino-tetrazolo-[1,5-b]-pyridazine. For purification, the compound was dissolved in dilute aqueous hydrochloric acid, any undissolved material was filtered off with suction and the filtrate rendered strongly alkaline with concentrated aqueous ammonia, 14.8 g. of material were thereby precipitated, the same melted, with foaming, at 260–262° C. Following trituration with 100 ml. 20% aqueous acetic acid, filtering with suction and washing with water, the compound melted, with foaming, at 270° C. and after recrystallization from 120 ml. 90% aqueous dimethyl sulfoxide melted with foaming at 291–292° C. The yield amounted to 5.4 g.

5.2 g. of the 6-hydrazino-8-amino-tetrazolo-[1,5-b]-pyridazine so obtained were dissolved in 120 ml. hot dimethyl sulfoxide and mixed with 5 drops glacial acetic acid and 5 ml. water. 11.5 g. 5-nitro-2-furan-imido-ethyl ether were then introduced at 55° C. and this temperature maintained for 2 hours. After cooling, 120 ml. water were added thereto, while cooling. The precipitated crystals were filtered off with suction, washed with methanol and thereafter with ether. There were thusly obtained 8 g. crude N-[6-(8-amino-tetrazolo-[1,5-b]-pyridazinylamino)]-5-nitro-2-furamidine which, still contained some 6-hydrazino-8-amino-tetrazolo-[1,5-b]-pyridazine as impurity. In order to remove this impurity, 7.4 g. of the crude product were dissolved in 300 ml. hot 1 N hydrochloric acid, a solution of 5 g. 5-nitrofuran-2-aldehyde in 150 ml. ethanol added thereto, whereupon the 6-hydrazino-8-amino-tetrazolo-[1,5-b] - pyridazine precipitated out as the hydrazone. The said hydrazine was filtered off with suction and the clear filtrate adusted to a pH of about 5–6 with sodium acetate, whereupon 4.95 g. of the red amidrazone, i.e., N-[6-(8-amino-tetrazolo-[1,5-b]-pyridazinylamino)]-5-nitro-2-furamidine, precipitated out. It was filtered off with suction and washed with water and then with methanol.

The bacteriostatic activity of the compounds in accordance with the invention was evaluated in vitro with respect to the following organisms:

*Staphylococcus aureus* SG 511 (12)
*Streptococcus pyogenes* Aronson (75)
*Streptococcus faecalis* (155)
*Escherichia coli* (18)
*Proteus mirabilis* (298)
*Pseudomonas aeruginosa* (71)

As comparison compounds, Furacin,[1] Furoxon,[2] and Furadantin[3] were employed. The absolute bacteriostatic minimal concentration in μg./ml. was determined for the three comparison compounds as well as for the following compounds of the invention:

(A) 3-(5-nitro-2-furyl)-s-triazolo-[4,3-b]-tetrazolo-[1',5'-f]-pyridazine.
(B) 3-[2-(5-nitro-2-furyl)-vinyl]-s-triazolo-[4,3-b]-tetrazolo-[1',5'-f]-pyridazine.
(C) 3-(5-nitro-2-furyl)-11-methyl-s-triazolo-[4,3-b]-tetrazolo-[1',5'f]-pyridazine.
(D) 3-(5-nitro-2-furyl)-10-methyl-s-triazolo-[4,3-b]-tetrazolo-[1',5'-f]-pyrazine.
(E) 3-(5-nitro-2-furyl)-10-N-pyrrolidinyl-s-triazolo-[4,3-b]-tetrazolo-[1',5'-f]-pyridazine.
(F) 3-(5-nitro-2-furyl)-10-amino-s-triazolo-[4,3-b]-tetrazolo-[1',5'-f]-pyridazine.
(G) Furacin.
(H) Furoxon.
(I) Furadantin.

[1] Trade name for nitrofurazone (5-nitro-2-furaldehyde semicarbazone), Eaton Laboratories, Norwich, N.Y.
[2] Trade name for furazolidone 3-(5-nitrofurfurylideneamino)-2-oxazolidinone, Eaton Laboratories, Norwich, N.Y.
[3] Trade name of nitrofurantoin [(N-(5-nitro-2-furfurylidene)-1-aminohydantoin)], Eaton Laboratories, Norwich, N.Y.

The results are set out in the following Table I.

TABLE I.—BACTERIOSTATIC ACTIVITY IN VITRO

| Organism | Absolute bacteriostatic minimal concentration in μg./ml. | | | | | | | | |
|---|---|---|---|---|---|---|---|---|---|
| | (A) | (B) | (C) | (D) | (E) | (F) | (G) | (H) | (I) |
| *Staphylococcus aureus*, SG 511 (12) | 1 | 0.25 | 0.5 | 0.5 | 0.25 | 0.5 | 8 | 1 | 4 |
| *Streptococcus pyogenes* Aronson (75) | 0.125 | 0.25 | 0.25 | 0.125 | 0.5 | 0.062 | 4 | 8 | 4 |
| *Streptococcus faecalis* (155) | 0.125 | 0.016 | 0.062 | 0.125 | 0.062 | | 16 | 4 | 4 |
| *Escherichia coli* (18) | 0.125 | 0.031 | 0.062 | 0.016 | 0.125 | 0.031 | 4 | 0.25 | 4 |
| *Proteus mirabilis* (298) | 4 | 2 | 8 | 8 | >16 | | 64 | 32 | 128 |
| *Pseudomonas aeruginosa* (71) | 2 | 1 | 2 | 4 | >16 | | >64 | 64 | 128 |

In addition, the following compounds were evaluated with respect to their bacteriostatic activity in the urine of rats following oral administration. The results of this experiment are set out in the following Table II.

TABLE II.—BACTERIOSTATIC ACTIVITY OF THE URINE IN RATS FOLLOWING ORAL ADMINISTRATION

[Bacteriostatic maximum dilution of urine against *Escherichia coli* (106) was determined using mixed urine samples 22 hours after 20 mg. test compound per kg. body weight had been orally administered. 6 rats were employed for each experiment and every value recorded in the table represents the results thereby obtained assuming that 6 rats produce 50 ml. urine during 22 hours]

| (A) | (B) | (C) | (D) | (I) |
|---|---|---|---|---|
| 1:990 | 1:16 | 1:82 | 1:165 | 1:54 |
| 1:888 | 1:48 | 1:255 | 1:260 | 1:30 |
| 1:860 | 1:13 | | | 1:41 |
| 1:656 | 1:37 | | | 1:19 |
| 1:272 | | | | 1:40 |
| 1:780 | | | | 1:21 |
| 1:343 | | | | 1:47 |

The compounds in accordance with the instant invention are anti-microbials and have been found to be bactericidal to the pathogens found in surface infections, gram negative as well as gram positive. They additionally have utility as agents for routine treatment of acute and chronic bacterial infections of the urinary tract, including those caused by Proteus sp. Further they lend themselves because of their properties to use in the prevention of treatment of mixed surface infections of wounds, severe burns, cutaneous ulcers, pyodermas, osteomyelitis, preparation of wounds and burns for skin grafting and prevention of infection of grafts and donor sites.

The compounds of the invention can be employed in the form of aqueous solutions or suspensions thereof, as for instance, in the form of a 0.01 to 0.05% aqueous suspension or solution; in the form of solutions in non-aqueous, hygroscopic liquid vehicles such as polyethylene glycol, for instance, 0.1–0.5% solutions in polyethylene glycol; incorporation into a water-soluble ointment-like base (concentration 0.1–0.5%) or in a powder base composed for instance of water-soluble polyethylene glycols (concentration 0.1–0.5%); or in a form suitable for ingestion. Thus, a preferred form is a tablet containing 50–200 mg. of active compound. Depending on the condition, symptomatic and laboratory responses 100–400 mg. per day can be administered. Another preferred form for orally administering the compounds of the invention is in the form of a suspension thereof in a water-miscible flavored gel. Such a gel can contain from 1 to 10 mg. of compound per cc.

We claim:
1. A compound of the formula:

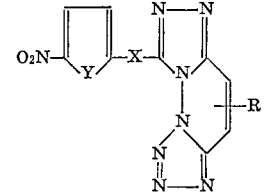

wherein X is a valency bond or vinyl, Y is a member selected from the group consisting of oxygen and sulfur, and R is a member selected from the group consisting of hydrogen, halogen, lower alkyl, pyrrolidinyl and amino.

2. A compound according to claim 1 designated 3-(5-nitro - 2 - furyl)-s-triazolo-[4,3-b]-tetrazolo-[1',5',-f]-pyridazine.

3. A compound according to claim 1 designated 3-[2-(5-nitro-2-furyl)-vinyl]-s-triazolo - [4,3 - b] - tetrazolo-[1',5'-f]-pyridazine.

4. A compound according to claim 1 designated 3-(5-nitro-2-furyl)-11-methyl-s-triazolo - [4,3 - b] - tetrazolo-pyridazine.

5. A compound according to claim 1 designated 3-(5-nitro - 2 - furyl) - 10-methyl-s-triazolo-[4,3-b]-tetrazolo-[1ı,5'-f]-pyridazine.

6. A compound according to claim 1 designated 3-(5-nitro - 2 - furyl) - 10 - N - pyrrolidinyl-s-triazolo-[4,3-b]-tetrazolo-[1',5'-f]-pyridazine.

7. A compound according to claim 1 designated 3-(5-nitro - 2 - furyl) - 10 - amino-s-triazolo-[4,3-b]-tetrazolo-[1',5'-f]-pyridazine.

References Cited

UNITED STATES PATENTS 3,138,593    6/1964    Burch.
3,164,595    1/1965    Burch et al.

NICHOLAS S. RIZZO, Primary Examiner

U.S. Cl. X.R.

260—250; 424—250

PO-1050
(5/69)

UNITED STATES PATENT OFFICE
CERTIFICATE OF CORRECTION

Patent No. 3,506,656       Dated April 14, 1970

Inventor(s) Herbert Berger, Kurt Stach and Wolfgang Vomel

It is certified that error appears in the above-identified patent and that said Letters Patent are hereby corrected as shown below:

Column 1, line 10 "B 89 538" should be -- B 89,534 --.

Column 2, line 55, "insert" should be -- inert --.

Column 8, line 9, "8.05 g" should be -- 8.04 g. --.

Column 9, line 37, "formed" should be -- foamed --.

Column 12, line 37, before "pyridazine" insert -- [1',5'-f] --.

Column 12, line 40, "[11,5'-f]" should be -- [1',5'-f] --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents